United States Patent [19]

Hangai et al.

[11] Patent Number: 4,964,111
[45] Date of Patent: Oct. 16, 1990

[54] SLIDER CONTROL DEVICE FOR DISK PLAYER

[75] Inventors: Toshimasa Hangai; Koichi Ishitoya; Akihiko Tagawa, all of Tokorozawa, Japan

[73] Assignee: Pioneer Electronic Corporation, Tokyo, Japan

[21] Appl. No.: 417,158

[22] Filed: Oct. 4, 1989

[30] Foreign Application Priority Data

Feb. 20, 1989 [JP] Japan .................................. 1-41367

[51] Int. Cl.⁵ ...................... G11B 17/30; G11B 17/22; H04N 5/76
[52] U.S. Cl. ............................. 369/215; 369/219; 369/33; 369/32; 358/342
[58] Field of Search .................. 369/215, 219, 221, 43

[56] References Cited

U.S. PATENT DOCUMENTS

| | | | |
|---|---|---|---|
| 4,316,143 | 2/1982 | Castle | 358/342 |
| 4,366,564 | 12/1982 | de Haan et al. | 358/342 |
| 4,481,613 | 11/1984 | Yokota | 369/219 |
| 4,679,181 | 7/1987 | Naito | 369/50 |
| 4,731,771 | 3/1988 | Maeda et al. | 369/32 |
| 4,835,752 | 5/1989 | Nakatsu et al. | 369/215 |
| 4,887,254 | 12/1989 | Nakatsu et al. | 369/33 |

Primary Examiner—Stuart S. Levy
Assistant Examiner—Kenneth B. Wells
Attorney, Agent, or Firm—Sughrue, Mion, Zinn, Macpeak & Seas

[57] ABSTRACT

A slider control device in a disk player wherein normal speed information in each operation; mode of the slider, holding a pickup, is stored in a memory beforehand and the moving speed of the slider in each operation mode is detected and compared with the normal speed. The driving source of the slider is controlled according to the result of comparison. With this arrangement, even when the slider is driven at a high speed using, for example, a linear motor as a driving source for the slider, it is possible to execute secure speed control.

6 Claims, 3 Drawing Sheets

SLIDER CONTROL DEVICE FOR DISK PLAYER

BACKGROUND OF THE INVENTION

1. Field of the Invention

The present invention relates to a slider control device for a disk player.

2. Description of the Prior Art

In a disk player for an information recording disk (hereinafter referred to simply as a disk) such as a video disk or a digital audio disk, a rotary motor has been used as a driving source for a slider which holds a pickup for reading information on a disk and is mounted movably in the radial direction of a disk. The rotary motion of the rotary motor is converted to a linear motion being decelerated by a combined mechanism of a gear and a rack for driving a slider in a linear direction. A rotary motor has limited responsiveness. Therefore, there is a limit for improving the speed of a search operation in which a desired recorded track is searched while driving a pickup at a high speed. Under such a condition, there is still a strong demand for improving the speed of search operation.

It is therefore considered to use a linear motor which has excellent responsiveness as a driving source in place of a rotary motor to drive a slider directly. When a linear motor is used as a driving source of a slider, since it has higher responsiveness in comparison with a rotary motor, the moving speed of a slider can be improved. On the other hand, the speed control of a slider becomes difficult, for example, there is a fear of losing control of a slider. Countermeasures for such problems are required.

OBJECTS AND SUMMARY OF THE INVENTION

The present invention has been made in consideration of the above mentioned problems, and an objective of the invention is to provide a slider control device which can securely execute the speed control of a slider, and particularly one which can securely prevent the slider from becoming uncontrollable.

In a slider control device according to the present invention, normal speed information is stored in a memory for each operation mode of a slider which holds a pickup, The moving speed of the slider in each operation mode is detected, and the detected speed is compared with a normal speed. The driving device of the slider is controlled on the basis of a result of the comparison.

DETAILED DESCRIPTION OF THE EMBODIMENT

Figure 1:
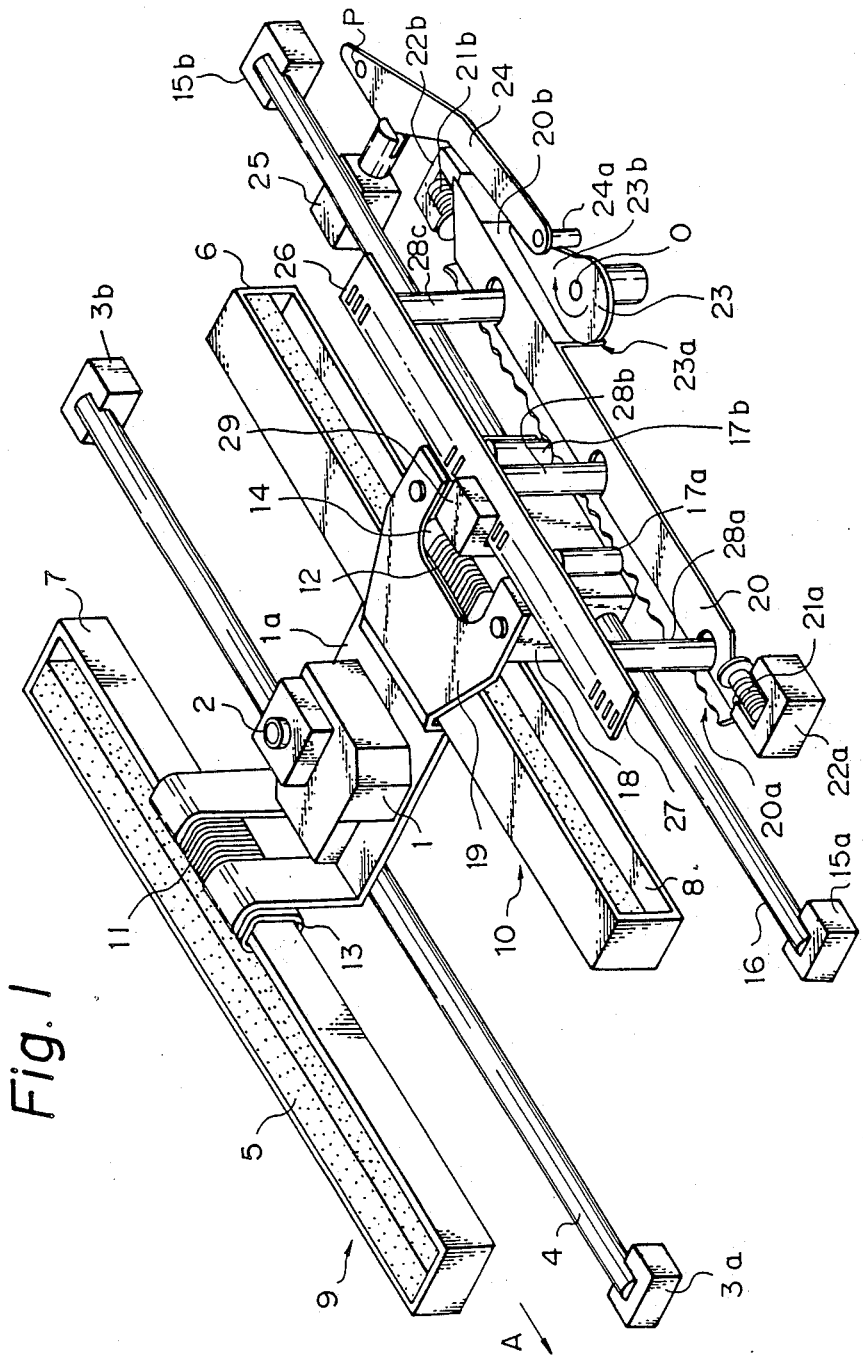
FIG. 1 is a schematic diagram showing an example of a slider driving mechanism to which the slider control device according to the present invention is to be applied.

An embodiment according to the present invention will be described in detail in the following referring to the drawings.

FIG. 1 is a constitutional drawing showing an example of a slider driving mechanism to which the slider control device according to the present invention is to be applied. In the figure, a slider 1, which holds an optical pickup 2 for reading the recorded information on a disk D (shown in FIG. 2), is provided to be freely movable along a linear guide shaft 4 being held by stoppers 3a and 3b at both ends. On both sides of the moving path of the slider 1, there are provided magnetic circuits 9 and 10 comprising magnets 5 and 6 disposed parallel to the guide shaft 4 and square-shaped loop yokes 7 and 8 which form closed magnetic loops being connected to magnets 5 and 6 respectively. Coils 11 and 12 are provided so that they surround each of these yokes 7 and 8 of the magnetic circuits 9 and 10, and these coils 11 and 12 are fixed to the slider 1 through coil holders 13 and 14. A moving coil type linear motor LM, which directly drives the slider 1, is constituted with the magnetic circuits 9 and 10, and the coils 11 and 12.

A linear-shaped guide shaft 16 held by stoppers 15a and 15b at both ends is provided parallel to the guide shaft 4 on the outside of the magnetic circuit 10. A moving body 18 having projections 17a and 17b on the side wall is engaged to the guide shaft 16 freely slidably. The moving body 18 is fixed to the slider 1 with a connecting arm 19 and so it moves together with the slider 1 being unified. An elongated lock plate 20 having an L-shaped section is provided along the guide shaft 16. The lock plate 20 having a corrugated part 20a on a side end part of the L shape and an engaging piece 20b on the opposite side is rotatably supported by bearings 22a and 22b at the rotary shafts 21a and 21b on both ends of the lock plate 20. In the vicinity of the engaging piece 20b of the lock plate 20 a pressing cam 23 is rotatably provided being energized in an arrow direction in the figure by an energizing means which is not shown in figure. The pressing cam 23 is engaged with the engaging piece 20b of the lock plate 20 through a cam surface 23a in which the distance from the center of rotation to the surface continuously varies in the peripheral direction, and the cam surface presses the engaging piece 20b by rotating in the arrow direction from the state as shown in the figure. A pin 24a provided on an end of a rocking arm 24 is engaged to a pawl 23b of the pressing cam 23. The rocking arm can be titubated making its other end as a rocking fulcrum, and the arm is driven to titubate by a plunger 25. The plunger 25 is in a excited condition when the power supply of a disk player is ON. A slider locking mechanism which fixes the slider 1 selectively is constituted as described in the above.

A shutter plate 27 having a plurality of slits 26 provided at a constant pitch is disposed along the guide shaft 16 and is held by three props 28a to 28c. A position sensor 29 is constituted by a light emitting element and a light receiving element in the state where the slits on shutter plate 27 are interposed between them. The position sensor 29 is fixed on the moving body 18 and it is moved together with the slider 1 to form a unity. The output of the position sensor 29 is supplied to an up/down counter 31 after being shaped to a pulse waveform in a waveform-shaping circuit 30. A count value of the up/down counter is supplied to a controller 32 as the position information of the slider 1.

Figure 2:
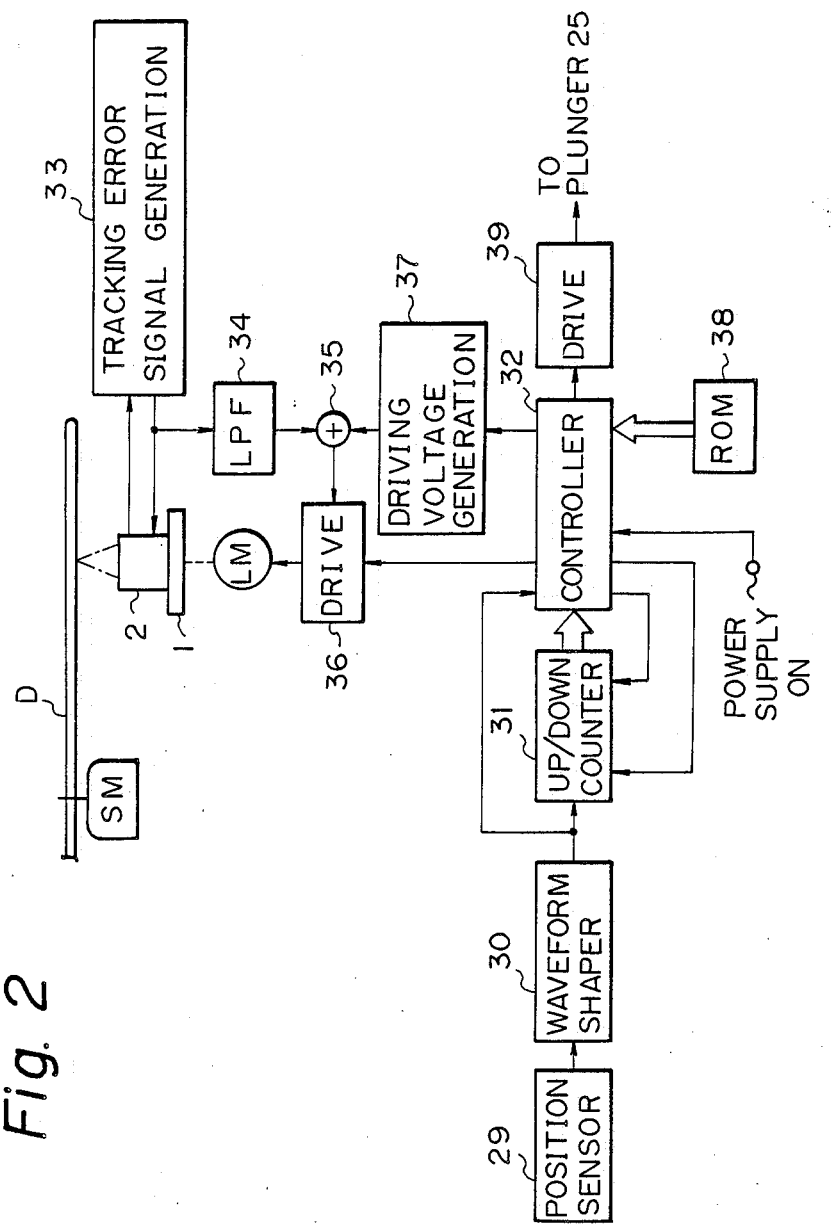
FIG. 2 is a block diagram showing an embodiment of the slider control device according to the present invention.

FIG. 2 is a block diagram showing an embodiment of a slider control device according to the present invention. In the figure, a tracking error signal generating circuit 33 generates a tracking error signal, having a polarity and a level corresponding to the direction deviation and the quantity deviation in the direction perpendicular to a track, of an information reading light spot of the pickup 2 for a recorded track of the disk D by an error detecting method such as a well known 3 beam method etc. based on the output of the pickup 2. The tracking error signal becomes a driving input for a built-in actuator in the pickup 2 and it always drives and controls the light spot for reading information to follow a recorded track. The disk D is driven to rotate by a spindle motor SM.

The tracking error signal is also supplied to a LPF 34 (low-pass filter). The low frequency component of a tracking error signal which passes the LPF 34 is input as a driving input to a driving circuit 36, which supplies a driving current to the coils 11 and 12 of the linear motor LM (refer to FIG. 1), through an adder 35. Thus in the normal play time of a disk player, the linear motor LM is driven by the low frequency component of a tracking error signal. In the case of a constant speed feed such as read in, read out or search etc., a driving voltage, a constant voltage output from a driving voltage generating circuit 37 corresponding to a command from the controller 32, is applied to the driving circuit 36 through the adder 35.

The controller 32 is, for example, constituted by a microcomputer. When it is detected that the slider 1 is reached a moving limit position on a side (for example, the slider 1 is abutted on a stopper 3a in FIG. 1) based on the fact that the change quantity per unit time of the count value of the up/down counter 31 is lower than a certain value, the up/down counter is reset and the up/down count of the up/down counter 31 is controlled corresponding to the moving direction of the pickup 2 according to the operation mode of the disk player such as read in, read out, play, search or scan etc. The count value of the counter 31 is obtained as the position information of the slider 1.

The controller 32 further calculates the moving speed of the slider 1 in each mode of the disk player based on pulse signals supplied from the waveform-shaping circuit 30 at each time when the position sensor 29 shown in FIG. 1 passes through the slit 26, and compares the speed obtained in the above with a normal speed in a corresponding operation mode obtained from the ROM 38, and the driving circuit 36 of the linear motor LM is driven and controlled according to the comparison result.

In the ROM 38, a storing means, information of the normal speed of the slider 1 is previously stored for each operation mode of the disk player in the form a table. An example of the table is shown below.

| Operation mode | Normal speed |
| --- | --- |
| Still | 0 |
| CAV play | About 90 mm/30 min. |
| CLV play | About 90 mm/30 min. or less |
| High speed feed | About 600 mm/sec. or less |
| Low speed feed | About 90 mm/3 sec. or less |
| CAV scan | About 90 mm/90 sec. |
| CLV scan | About 90 mm/90 sec. or less |

When the power supply is ON, the controller 32 drives and controls the plunger 25 of the slider lock mechanism through the driving circuit 39 and keeps the plunger 25 in a excited condition. When a disk player is in a stop mode, the controller 32 monitors the count value of the up/down counter, and if the count value varies more than a certain value, it judges that the slider 1 which should not move is moved by some external disturbance such as an external vibration, and it places the plunger 25 in a non-excited condition through the driving circuit 39 to fix the slider 1. When the power supply of the disk player is OFF, the driving current for the plunger 25 is not supplied, so that the slider lock mechanism is automatically made to be in a locked condition.

Figure 3:
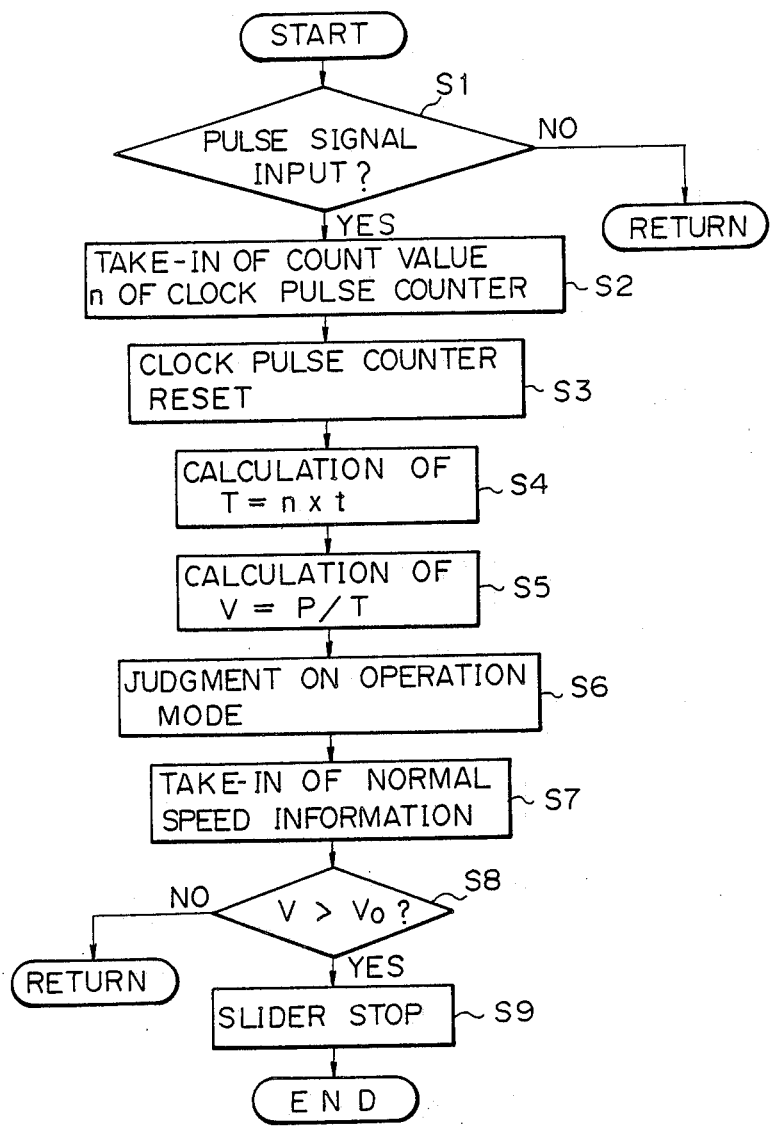
FIG. 3 is a flow chart showing the steps of control procedure of the slider in each operation mode.

In the next step, the control procedures for the slider 1 in each operation mode executed by the processor in the controller 32 are described referring to the flow chart in FIG. 3. This subroutine is repeatedly called for execution at a clock pulse period t of the internal standard clock pulses.

The processor, as shown in FIG. 1, judges whether a pulse signal output from the waveform-shaping circuit 30 at each time when the position sensor 29 passes through the slit 26 is input or not (step S1), and if the pulse signal is not input the flow is returned to the main flow. If the pulse signal is input, the processor takes in the count value n from the built-in clock pulse counter for counting the standard clock pulses (step S2) and resets the clock pulse counter (step S3). The clock pulse counter counts the number of standard clock pulses during the period from the time when the pulse signal is input in the last time till it is input in the next time.

The processor finds the moving time T, which is spent by the position sensor 29 for moving the distance between the slits 26 disposed at a constant pitch, by the calculation of n×t based on the count value n taken in from the clock pulse counter and the period t of clock pulses (step S4), and further the speed of the position sensor 29 when it moves between the slits 26, that is, the moving speed v of the slider 1 at the present time is found by calculating p/T based on the moving time T and the constant pitch p (step S5).

The processor judges the present operation mode of the disk player (step S6), and it takes in the normal speed information of the slider 1 in the corresponding operation mode from the table stored in the ROM 38 (step S7), and determines if the present moving speed v exceeds the normal speed v0 (step S8). In the case of v>v0, the slider 1 is moving at a speed out of the normal speed which shows the probability of losing control, so that the driving circuit 36 for the linear motor LM is controlled to stop the slider 1. In the case of v≦v0, the slider 1 is moving at a normal speed, so that the flow returns to the main flow.

In the above-mentioned embodiment, when the present moving speed v exceeds the normal speed v0 it is judged that the speed is out of the normal speed. However, it is also possible to constitute a system in which an allowable range of variation for a normal speed v0 is set, and if the present moving speed v goes beyond the range, then it is judged to be moving at a speed of out of the normal speed.

In the above-mentioned embodiment, when the moving speed of the slider 1 goes beyond the normal speed the control is executed to stop the slider 1 immediately, but it is also possible to take other measures such as to eject the disk.

Furthermore in the above-mentioned embodiment, a description is given on a method wherein slits 26 and an optical position sensor 29 are used as a single pulse signal generating means for every movement of the slider 1 for a definite distance (constant pitch), but the method is not limited to the one mentioned in the above, and an essential point is that a single pulse signal is generated in every movement of the slider 1 for a definite distance.

In a slider control device according to the present invention, the normal speed information in each operation mode of a slider, which holds a pickup, is stored in a memory. The moving speed of the slider in each operation mode is detected, and the moving speed is compared with the normal speed. The driving source of the slider is controlled according to the result of comparison. Thus, the moving speed of the slider is monitored by a speed detector independent of a slider servo control; therefore it is securely executed to control the speed of a slider. Moreover, the slider is securely prevented from becoming uncontrollable.

What is claimed is:

1. A slider control device in a disk player comprising a pickup for reading recorded information on an information recording disk, a slider holding said pickup and provided movably in the radial direction of said information recording disk, and a driving means for moving said slider, said slider control device comprising:

storing means for storing normal speed information of said slider in each operation mode of said disk player;

speed detecting means for detecting the moving speed of said slider; and control means for driving and controlling said driving means based on the comparison result obtained by comparing the moving speed information obtained from said speed detecting means in each operation mode of said disk player and the normal speed information in the corresponding operation mode obtained from said storing means.

2. A slider control device according to claim 1 wherein said speed detecting means comprises signal generating means for generating a single pulse signal for each movement of said slider of a definite distance, and calculating means for calculating the moving speed of said slider based on the generation interval of said pulse signals and said definite distance.

3. A slider control device according to claim 1 wherein said driving means is a linear motor.

4. A slider control device according to claim 1, wherein said control means stops said slider when it is determined that said detected moving speed is greater than said normal speed.

5. A slider control device according to claim 1, wherein said control means stops said slider when it is determined that said detected moving speed is greater by a predetermined difference than said normal speed.

6. A slider control device according to claim 1, wherein said control means ejects said information recording disk when said detected moving speed is greater than said normal speed.

* * * * *